United States Patent
Bonitatibus, Jr. et al.

(10) Patent No.: US 9,803,139 B1
(45) Date of Patent: Oct. 31, 2017

(54) PROCESS FOR REMOVING ALUMINUM-SILICON COATINGS FROM METALLIC STRUCTURES, AND RELATED PROCESSES FOR PREPARING MAGNETIC COMPONENTS

(71) Applicant: GENERAL ELECTRIC COMPANY, Schenectady, NY (US)

(72) Inventors: Peter John Bonitatibus, Jr., Saratoga Springs, NY (US); Francis Johnson, Clifton Park, NY (US); Min Zou, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/191,662

(22) Filed: Jun. 24, 2016

(51) Int. Cl.
*C09K 13/02* (2006.01)
*C23F 1/00* (2006.01)

(52) U.S. Cl.
CPC ............. *C09K 13/02* (2013.01); *C23F 1/00* (2013.01)

(58) Field of Classification Search
None
See application file for complete search history.

(56) References Cited

U.S. PATENT DOCUMENTS

| | | | |
|---|---|---|---|
| 3,954,648 A | 5/1976 | Belcak et al. | |
| 4,572,792 A | 2/1986 | Muller | |
| 4,721,549 A | 1/1988 | Bogenschutz et al. | |
| 5,238,507 A * | 8/1993 | Kugimiya | G11B 5/133 148/307 |
| 5,643,474 A | 7/1997 | Sangeeta | |
| 6,132,520 A | 10/2000 | Schilbe et al. | |
| 6,146,692 A | 11/2000 | Sangeeta et al. | |
| 6,531,049 B1 | 3/2003 | Kariya et al. | |
| 6,878,215 B1 | 4/2005 | Zimmerman, Jr. | |
| 2015/0361545 A1 * | 12/2015 | Walker | B22F 1/0074 427/380 |
| 2016/0102012 A1 * | 4/2016 | Pilon | C09K 13/08 216/97 |

OTHER PUBLICATIONS

Lee et al., "Photoresist Removal after Plasma Etching of Metal Film using TiW as Antireflective Coating or as a Barrier Metal", ESSDERC '94: 24th European Solid State Device Research Conference, pp. 295-298, Sep. 11-15, 1994, Edinburgh, Scotland.

Hausbrand et al., "Corrosion of zinc-magnesium coatings: Mechanism of paint delamination", Corrosion Science, vol. 51, Issue: 9, pp. 2107-2114, Sep. 2009.

* cited by examiner

*Primary Examiner* — Allan Olsen
(74) *Attorney, Agent, or Firm* — John P. Darling

(57) ABSTRACT

A method for selectively removing an aluminum-silicon coating fired on a surface of a metallic structure is described. The method includes the step of contacting the coating with molten potassium hydroxide (KOH), under conditions sufficient to remove the coating without substantially affecting the metallic surface. Methods for preparing a magnetic component are also described. They involve masking preselected regions of the surface of the component, using an aluminum-silicon coating that is fired onto the surface, prior to a nitriding step. The coating is then removed according to the procedure outlined herein.

20 Claims, 1 Drawing Sheet

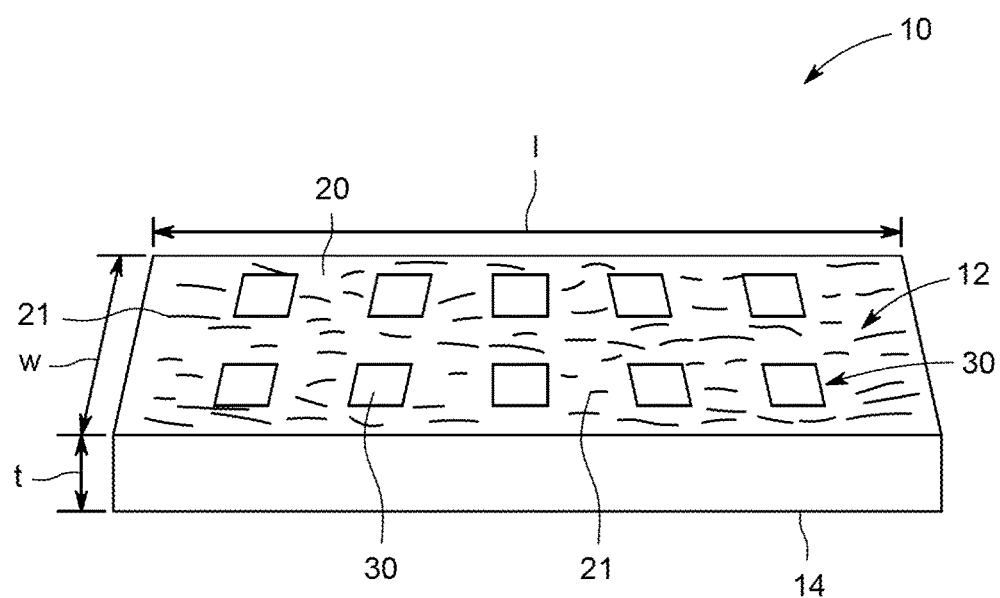

PROCESS FOR REMOVING ALUMINUM-SILICON COATINGS FROM METALLIC STRUCTURES, AND RELATED PROCESSES FOR PREPARING MAGNETIC COMPONENTS

TECHNICAL FIELD

This disclosure relates generally to coated metallic structures. In some specific embodiments, the disclosed invention relates to methods for removing aluminum-silicon coatings that have been fired onto the surface of various metallic components.

BACKGROUND OF THE INVENTION

A number of advanced coating systems are often applied to one or more surfaces of metallic components or metallic portions of components formed from other materials. The coatings are often used to protect the surface or substrate, providing electrical or thermal insulation, or providing wear resistance, corrosion resistance, or oxidation resistance. A wide variety of specialty materials are available for these uses, including thermal barrier materials (e.g., stabilized zirconia) that are used to protect superalloy parts and other high-temperature articles. Other protective coatings can be formed from many different alumina, carbide, boride, or silicide compositions.

Other specific examples of specialized compositions include various aluminum-silicon coatings, which can include aluminum-silicate materials, aluminide silicide materials, and the like. In some instances, the various coatings mentioned above are used for purposes other than surface protection. For example, they may be used for cosmetic purposes, or as gas-barrier coatings; or for masking sections of a substrate while other processing steps are carried out on the substrate.

Many of the materials described above are designed to be permanently deposited on the substrate, and not removed for the life of the part or device. As an example, some of the aluminum silicate materials are applied to a surface in slurry form. The coatings can be heat-treated to remove any volatile materials such as organic binders, or sometimes simply air-dried at ambient temperature. Usually, the coatings are then fired onto the substrate surface, e.g., at temperatures above 500° C. and sometimes above 1,000° C., to permanently bond the coating to the substrate. The highly adherent coatings of this type can protect a variety of articles from the severe effects of temperature, corrosion, abrasion, and the like.

However, some of the performance coatings described above are very useful for applications in which the coatings need to be removed at some point. One example relates to various coatings used as masking materials. As described in a pending U.S. patent application Ser. No. 14/068,937, methods for preparing magnetic components require the masking of pre-selected sections of the component surfaces. After the components are heat-treated and nitrided in a specialized reaction, the masking material or "stop-off" needs to be removed.

However, conventional materials and processes for removing various masking materials from metallic substrates exhibit drawbacks when used for aluminum-silicon coatings like the aluminum silicates. Some of the coating removal materials are unable to remove most of the masking material from the surface. Other coating removal materials may be somewhat effective in removing the masking material, but damage or otherwise modify the underlying substrate.

With these observations and concerns in mind, improvements in methods and compositions for removing aluminum-silicon coatings from a metallic substrate would be welcome in the art. The new technology should improve the ability to remove the coatings, e.g., masking materials, without adversely affecting the substrate. The materials and processes should also be relatively economical to obtain and implement. Moreover, use of the new materials should not involve difficult issues regarding safety or health procedures.

SUMMARY OF THE INVENTION

Some embodiments of this invention are directed to a method for selectively removing an aluminum-silicon coating fired on a surface of a metallic structure. The method comprises the step of contacting the coating with molten potassium hydroxide (KOH), under conditions sufficient to remove the coating without substantially affecting the metallic surface.

Other embodiments relate to a method of preparing a magnetic component, comprising:

a) masking pre-selected sections of a surface portion of the component, using a nitrogen masking material that comprises a fired aluminum-silicon coating, to form a masked region in the component;

b) heat-treating the component in a nitrogen-rich atmosphere at a temperature greater than about 900° C., to form intermixed first and second regions in the magnetic alloy; wherein the first region comprises a magnetic phase;
the second region comprises a non-magnetic phase;
the second region comprises greater than 0.1% nitrogen; and then c) selectively removing the nitrogen masking material, by contacting the material with molten potassium hydroxide, under conditions sufficient to remove the masking material without substantially affecting the component.

BRIEF DESCRIPTION OF THE DRAWING FIGURES

FIG. 1 is an illustration of a dual phase magnetic component, as it relates to embodiments of the present invention.

DETAILED DESCRIPTION OF THE INVENTION

It should be noted that when introducing elements of various embodiments of the present invention, the articles "a," "an," "the," and "said" are intended to mean that there are one or more of the elements, unless otherwise indicated. Moreover, the term "and/or" includes any and all combinations of one or more of the associated listed items. The terms "comprising," "including," and "having" are intended to be inclusive, and mean that there may be additional elements other than the listed elements. Approximating language, as used herein throughout the specification and claims, may be applied to modify any quantitative representation that could permissibly vary without resulting in a change in the basic function to which it is related. Accordingly, a value modified by a term or terms, such as "about" or "substantially" is not to be limited to the precise value specified. In some instances, the approximating language may correspond to the precision of an instrument for measuring the value.

The metallic structure or substrate used for embodiments of this invention can be formed from a variety of materials. Non-limiting examples include iron, cobalt, nickel, aluminum, chromium, titanium, and copper, as well as mixtures or alloys which include any of the foregoing (e.g., stainless steel). Moreover, the structure could be formed of a non-metallic material like a polymer (e.g., plastic) or a ceramic, that includes at least one metallic surface on which a coating is disposed.

A variety of aluminum-silicon coatings can be deposited on one or more surfaces of the metallic structure (sometimes referred to herein as a substrate, part, or component). As used herein, the term "aluminum-silicon" is meant to include various compositions containing aluminum and silicon in some form. Non-limiting examples include aluminum-silicate coating materials (some of which may include mullite), and aluminide silicide materials, the latter sometimes being referred to as "aluminum silicide" materials. Some of the aluminide-silicide coating materials are commercially available silicon-modified aluminum compositions, such as Sermaloy J (from Sermatech International, Inc. of Pottstown, Pa.). U.S. Pat. Nos. 6,126,758 and 7,993,759, both incorporated herein by reference, describe related compositions. Some of these coatings are referred to as "diffusion coatings" or "diffusion aluminide coatings".

Aluminum-silicate coatings are known in the art and described in various sources, such as U.S. Pat. No. 7,271,125, incorporated herein by reference. They are often available in the form of a liquid dispersion, e.g., an aqueous dispersion. The dispersion may also include various organic constituents, e.g., binders, dispersants, defoamers, and the like. Moreover, in some embodiments, the coating compositions include at least one alkali metal, such as sodium and potassium. One non-limiting example of these coating compositions are the Sealmet™ materials (sodium-potassium-aluminum-silicate), available from ZYP Coatings, Inc., Oak Ridge, Tenn.

As mentioned above, many of the aluminum-silicon coatings are formulated and applied to the metal substrate in a manner that ensures permanent adhesion. As one example in the case of aluminum silicates, the two-step process of curing (drying) and then heating at a very high-temperature (e.g., baking or "firing") provides a permanent protective coating for various metal substrates. However, for end use applications in which such a coating must be eventually removed, traditional techniques for stripping the coating are either ineffective, or are damaging to the underlying metal surface.

One solution according to embodiments of this invention is to contact the aluminum-silicon coating with molten potassium hydroxide (KOH), as mentioned above. Contact with the potassium hydroxide solution as described herein removes substantially all of the coating. As used herein, removal of "substantially all of the coating" means removing at least 90% of the coating on all surfaces of the article, and more often, at least 95% of the coating. In some highly preferred embodiments "substantially" refers to the removal of at least about 99% of the coating.

Moreover, treatment with molten KOH removes the aluminum-silicon coating without substantially affecting the underlying metal surface, e.g., without pitting the surface or damaging it via intergranular boundary attack, in a way that would detract from its end use. Furthermore, unlike some of the other conventional stripping processes, the present removal process does not require the use of strong mineral acids and other additives that may emit hazardous, acidic fumes.

Potassium hydroxide is available in a variety of forms, e.g., particles, flakes, and pellets. In some preferred embodiments for this invention, the KOH is provided in substantially neat form, e.g., with no more than about 15% by weight water. As is known in the art, KOH is hygroscopic, and typically contains varying amounts of water, as well as naturally-formed carbonates. In general, for the purposes of this disclosure, molten KOH is said to be composed of at least about 85% by weight of potassium hydroxide itself. Often, the KOH is used in pellet form, and a commercial example is "Potassium Hydroxide Certified ACS Pellets" (CAS 1310-58-3), available from Fisher Scientific. Such a material becomes molten and useful for the inventive embodiments at a temperature in the range of about 270° C. to about 280° C.

Various techniques can be used to treat the substrate with the molten KOH. For example, the substrate can be continuously sprayed with the composition, using various types of spray guns. Alternatively, the molten KOH could be brushed onto the substrate, or poured over the substrate (and continuously recirculated).

In preferred embodiments, the substrate is immersed in a bath of the molten KOH. Immersion in this manner (in any type of vessel suitable for molten KOH, e.g., stainless steel) often permits the greatest degree of contact between the molten KOH and the coating which is being removed. Immersion time and bath temperature will depend on a number of factors, such as the size of the coated component; the particular type of coating being removed; its thickness; and the manner in which it had been applied and fired (e.g., baked) on the surface of the component.

The temperature of the bath will usually be that which is sufficient to maintain the KOH in molten form, e.g., about 270° C. to about 280° C. In regard to immersion time, a non-limiting illustration can be provided. For an aluminum silicate coating having a thickness up to about 3 mils (76 microns), an immersion time at the indicated bath temperature may be in the range of about 30 minutes to about 210 minutes. For coating thicknesses greater than 3 mils, the required immersion time may also need to be greater, e.g., up to about 4 hours. During this time, the bath can be stirred or otherwise agitated by conventional techniques. In some instances, it is advantageous to rotate or spin the part within the bath, to ensure maximum exposure of the surfaces of the part to the treatment agent.

After removal from the bath (or after contact of the coating by any other technique mentioned above), the substrate is typically rinsed in water (often until the pH of the water is neutral), for further use or processing. Other steps sometimes used after the bath treatment include sonication (e.g., 15-30 minutes), and/or a brief acid wash, e.g., 10-30 seconds with an aqueous solution of hydrogen chloride.

In one embodiment of the invention, the metallic structure or component may be a part of an electric machine. As used herein, "electric machine" refers to any type of electric motor or electric generator. These types of devices are all electromechanical energy converters, converting electricity to mechanical power, or mechanical power to electricity. (As used herein, transformers are also said to be covered under the definition of "electric machine"). Some particular examples of electric machines include permanent magnet machines, switched reluctance machines, synchronous reluctance machines, and induction machines.

As a specific example, the magnetic component can be the rotor lamination of an electric motor. The power density of such an electric machine can be increased by increasing its magnetic utilization. This characteristic can, in turn, be increased by the use of a combination of processing and alloying steps that provide the lamination with localized regions of high- and low magnetic permeability. Such a treated structure is generally known in the art and referred to as a "dual phase" magnetic microstructure. The localized regions of high- and low magnetic permeability tend to desirably reduce flux losses during operation of the rotor in the electric motor or similar device.

U.S. patent application Ser. No. 14/068,937, filed on Oct. 31, 2013 for L. Dial et al, and incorporated herein by reference, describes some types of components made from dual phase magnetic materials. The components are formed by a process that generally comprises the following steps:

a) masking pre-selected sections of a surface portion of the base component, using a nitrogen stop-off (masking) material that comprises a fired aluminum-silicon coating (e.g., aluminum silicate), so as to form a masked region in the component. As described in the referenced patent application of L. Dial et al, a nitrogen stop-off material is a chemical composition that discourages nitrogen diffusion into selected regions of a magnetic component. Step (b) is then undertaken:

b) heat-treating the component in a nitrogen-rich atmosphere at a temperature greater than about 900° C., to form intermixed first and second regions in the magnetic alloy; wherein the first region comprises a magnetic phase; and
the second region comprises a non-magnetic phase.

(As further set forth in Ser. No. 14/068,937, some embodiments contemplate the second region including greater than about 0.1% nitrogen). As also described therein, a dual phase magnetic component can be formed by the disclosed process. Specifically, this is carried out by stabilizing austenite (a metallic, non-magnetic allotrope of iron or a solid solution of iron with carbon) at room temperature, in selected regions of the component, by way of a nitriding process, while retaining strongly ferromagnetic martensite or ferrite phases in other regions of the component.

FIG. 1 is an illustration of a component 10, that is to be provided with the dual phase magnetic characteristics described above. The component is typically formed of a ferromagnetic material. (In some embodiments, the ferromagnetic material has a very reduced concentration of carbon). Component 10 can be in any size and shape, depending on its end use. As illustrated, the component has a rectangular shape with top surface 12, and bottom surface 14.

The magnetic component 10 includes two marked regions, i.e., a first region 20 and a second region 30. The regions are situated so that the masked region 20 in the surface portion of the component corresponds to the first region, and region 30, which is not masked by the stop-off/masking material, corresponds to the second region. The first region 20 is designed to be the magnetic region, and is masked, using the stop-off material 21 on the component 10. The second region 30 is not masked, and hence allows the nitrogen to diffuse through the component 10, making the regions non-magnetic.

The stop-off/masking material is the aluminum-silicon (e.g., aluminum silicate) coating described herein, and it also usually functions as a gas barrier material. As mentioned above, many of the aluminum silicate materials are applied to a surface in the form of an aqueous slurry, and then air-dried (e.g., at room temperature) or heat-treated to remove any volatile materials such as organic binders. If heating is used, the initial heat treatment will depend on various factors, but is usually in the range of about 350° C. to about 600° C. The coating materials are then fired or "baked" onto the substrate surface, e.g., at temperatures of at least about 600° C., and sometimes, above about 1,000° C., to permanently bond the coating to the substrate. As mentioned in pending application Ser. No. 14/068,937, the firing step is often carried out at a temperature (often greater than about 900° C.) sufficient to selectively "nitride" areas of the substrate that are not covered by the masking material.

As alluded to previously, this masking material is highly preferred because it adheres tenaciously to the substrate. However, the material needs to be removed after the selective nitriding process is complete. The use of the solution of molten potassium hydroxide, under the conditions described herein, effectively removes the masking material without damaging or otherwise altering any treated surface of component 10 (FIG. 1).

Other details for various embodiments related to dual phase magnetic materials are set forth in more detail, in application Ser. No. 14/068,937, as well as in U.S. Pat. No. 7,489,062 (Shah et al) and U.S. Patent Publications 2015/0295454 (A. El-Refaie et al) and 2015/0102606 (Shah M. et al), all of which are also incorporated herein by reference. As described in Ser. No. 14/068,937, the dual phase materials can be used as part of a synchronous reluctance machine, having a stator and a rotor shaft operationally disposed within the confines of the stator. The magnetic and nonmagnetic regions can serve as laminated segments within the machine, e.g., a four-pole machine. However, many variations can be present in various designs for these machines, including modifications in the number of poles and the number of laminations, for example. All of these designs include metallic components (such as the dual phase magnetic structures) treated according to embodiments of the present invention.

In some alternative embodiments of the invention, molten cesium hydroxide (CsOH) may be used to remove certain types of aluminum-silicon coatings from the substrates described above. In other alternative embodiments, a combination of CsOH and KOH may be used. However, for most end uses, the use of KOH by itself is highly preferred.

EXAMPLES

The examples that follow are merely illustrative, and should not be construed to be any sort of limitation on the scope of the claimed invention. Unless specified otherwise, all ingredients are commercially available from common chemical suppliers.

Example 1

A series of treatment compositions were prepared for testing, in terms of their effectiveness in removing aluminum-silicon coatings as described previously. A base coating formed of Sealmet™ material (sodium-potassium-aluminum-silicate), available from ZYP Coatings, Inc., Oak Ridge, Tenn., was applied to a ferritic steel coupon. The coating was dried at a temperature of about 525° C., and then fired at a temperature of 1100-1200° C., (which can satisfy the required nitrogenation temperature for appropriate substrates intended for magnetic components, as discussed previously). The fully-baked coating had a thickness no greater than about 3 mils (76 microns).

Sample 1 was a 45% by weight aqueous solution of potassium hydroxide (KOH). Sample 2 was a 25% by weight aqueous solution of cesium hydroxide (CsOH). Sample 3 was a 50% by weight aqueous solution of cesium hydroxide; and sample 4 was a 50-50 mixture of 24% by weight CsOH and 46% by weight KOH.

Each coated coupon was fully immersed in a bath of the respective treatment composition, and remained undisturbed during the heating process in an autoclave. Each treatment solution was maintained at a temperature of 120° C. The immersion time was 24 hours.

After removal from the baths, each coupon was rinsed and examined. In each instance, the respective treatment composition removed a portion of the Sealmet™ coating. However, most of the coating in each instance remained on the substrate, providing an indication that aqueous solutions of the treatment agents were not effective for embodiments of this invention.

Example 2

Samples 5, 6 and 7 were treatment compositions based on various molten metal hydroxides (neat). No external water or other aqueous material was added to any of the hydroxides, although some residual water may have been present in the solid product obtained from the manufacturer. Sample 5 was molten sodium hydroxide (NaOH), and outside the scope of this invention. Sample 6 was molten KOH, within the scope of the invention. Sample 7 was molten CsOH, also within the scope of this invention.

The same type of coated coupons used in Example 1 were used here. Each coated coupon was fully suspended in a melt of the respective treatment composition. For samples 5 (NaOH) and 6 (KOH), the coupons remained undisturbed (no stirring) during the heating process, at 350° C.-375° C. and 270° C.-280° C., respectively. The coupons were suspended in the melt for 1 hour. For sample 7, the coupon was suspended in the CsOH melt (360° C.-390° C.) for 1 hour. In one instance, a coupon suspended in the CsOH melt was not moved in the melt at all; and there was no stirring of the melt. In another instance, the coupon was rotated in the melt for 1 hour. The inventors observed that rotating or otherwise stirring the coupon itself in the melt was often very preferred, in terms of both coating removal, as well as providing smoother, polished coupon surfaces.

After removal from the respective melts, each coupon was rinsed with water until the run-off was pH-neutral, and examined. The coupon treated in the composition of sample 5 (NaOH) showed only minimum removal of the Sealmet™ coating, as most of the coating remained on the coupon-substrate. However, use of the composition of sample 6 (KOH) resulted in substantially complete removal of the Sealmet™ coating. Substantially complete removal of the coating was also evident when using sample 7 (CsOH), both in the static melt process and a stirred melt process.

For some of the samples treated with molten KOH, the thickness of the aluminum silicate coating (Sealmet™) on the substrate was varied. For example, some of the coatings were less than 3 mils in thickness, while others were greater than 3 mils. The thicker coatings were more difficult to remove in some instances. However, the thicker coatings were successfully removed after an extended period of time, e.g., about 4 hours suspension in the molten KOH.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for selectively removing an aluminum-silicon coating tired on a surface of a metallic structure, comprising the step of contacting the coating with molten potassium hydroxide (KOH), under conditions sufficient to remove the coating without substantially affecting the metallic surface, wherein the molten potassium hydroxide contacts the coating at a temperature in the range of about 270° C. to about 280° C.

2. The method of claim 1, wherein the molten potassium hydroxide comprises at least about 85% by weight potassium hydroxide.

3. The method of claim 1, wherein contact of the coating with the molten potassium hydroxide is carried out by immersion of the metallic structure in a bath of the molten potassium hydroxide.

4. The method of claim 3, wherein the time of immersion for a coating having a thickness of up to about 3 mils (76 microns) is in the range of about 30 minutes to about 210 minutes.

5. The method of claim 1, wherein the aluminum-silicon coating comprises an aluminum-silicate material or an aluminide silicide material.

6. The method of claim 1, wherein the aluminum-silicon coating comprises at least one alkali metal.

7. The method of claim 6, wherein the aluminum-silicon coating comprises sodium and potassium.

8. The method of claim 1, wherein the aluminum-silicon coating is applied to the surface of the metallic structure in the form of an aqueous slurry.

9. The method of claim 8, wherein the slurry comprises at least one organic binder.

10. The method of claim 9, wherein the slurry is dried before being fired, at a temperature sufficient to remove substantially all of the organic binder material.

11. The method of claim 10, wherein the dried coating is fired at a temperature of at least about 500° C.

12. The method of claim 11, wherein the coating is nitrified while being fired.

13. The method of claim 11, wherein the coating is substantially gas-impermeable.

14. The method of claim 12, wherein the coating is a masking material that covers selected regions of the surface of the metallic structure.

15. A method of preparing a magnetic component, comprising:
  masking pre-selected sections of a surface portion of the component, using a nitrogen masking material that comprises a fired aluminum-silicon coating, to form a masked region in the component;
  b) heat-treating the component in a nitrogen-rich atmosphere at a temperature greater than about 900° C., to form intermixed first and second regions in the magnetic alloy; wherein
    the first region comprises a magnetic phase;
    the second region comprises a non-magnetic phase;
    the second region comprises greater than 0.1% nitrogen; and then
  c) selectively removing the nitrogen masking material, by contacting the material with molten potassium hydroxide, under conditions sufficient to remove the masking material without substantially affecting the component.

16. The method of claim 15, wherein the molten potassium hydroxide contacts the masking material at a temperature in the range of about 270° C. to about 280° C.

17. The method of claim 15, wherein the molten potassium hydroxide comprises at least about 85% by weight potassium hydroxide.

18. The method of claim 15, wherein the magnetic component is a portion of an electric machine.

19. The method of claim 18, wherein the electric machine is selected from permanent magnet machines, switched reluctance machines, synchronous reluctance machines, and induction machines.

20. A method for selectively removing an aluminum silicon coating fired on a surface of a metallic structure, comprising the step of contacting the coating, with molten cesium hydroxide (CsoH) or a combination of molten potassium hydroxide (KOH) and molten CsOH, under conditions sufficient to remove the coating without substantially affecting the metallic surface.

* * * * *